(12) United States Patent
Kanazawa

(10) Patent No.: US 8,024,684 B2
(45) Date of Patent: Sep. 20, 2011

(54) APPARATUS, METHOD, AND COMPUTER PRODUCT FOR ESTIMATING POWER CONSUMPTION OF LSI

(75) Inventor: Yuzi Kanazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 12/004,703

(22) Filed: Dec. 21, 2007

(65) Prior Publication Data

US 2008/0195985 A1   Aug. 14, 2008

(30) Foreign Application Priority Data

Feb. 13, 2007   (JP) ................. 2007-031868

(51) Int. Cl.
   G06F 9/455 (2006.01)
   G06F 17/50 (2006.01)
(52) U.S. Cl. ..................................... 716/109
(58) Field of Classification Search .......... 716/4–6, 716/109
   See application file for complete search history.

(56) References Cited

U.S. PATENT DOCUMENTS

| | | | | |
|---|---|---|---|---|
| 6,195,776 | B1 * | 2/2001 | Ruiz et al. ................ | 714/738 |
| 7,693,676 | B1 * | 4/2010 | Keller et al. .............. | 702/118 |
| 2003/0046643 | A1 * | 3/2003 | Ohta et al. ................ | 716/4 |
| 2005/0235185 | A1 * | 10/2005 | Campbell .................. | 714/726 |
| 2007/0234248 | A1 * | 10/2007 | Yamamoto ................ | 716/5 |
| 2008/0072112 | A1 * | 3/2008 | Varadarajan et al. ..... | 714/738 |

OTHER PUBLICATIONS

Hiroyuki Higuchi, "Analysis of Maximum Switching Activities in Sequential Circuits for Power Supply Integrity Validation." ACM/IEEE International Workshop on Logic and Synthesis, 2006.
Biere et al., "Symbolic Model Checking using SAT procedures instead of BDDs" DAC 99, Louisiana, pp. 317-320.
Ganai et al, "Improved SAT-based Bounded Reachability Analysis," International Conference on VLSI Design, 2002, pp. 729-734.

* cited by examiner

Primary Examiner — Suresh Memula
(74) Attorney, Agent, or Firm — Greer, Burns & Crain, Ltd.

(57) ABSTRACT

Design data of a cell group is copied to obtain design data of an antecedent cell group and of a subsequent cell group. Design data of a combinational circuit is copied to generate the combinational circuits in plural corresponding to a given number of cycles n (n=2, 3, 4 . . . , where n=3 in FIG. 4). The design data of the combinational circuits are connected in series between the design data of the antecedent cell group and the design data of the subsequent cell group. As a result, design data of an input constraint circuit representing an input constraint(s) of the circuit can be generated.

9 Claims, 14 Drawing Sheets

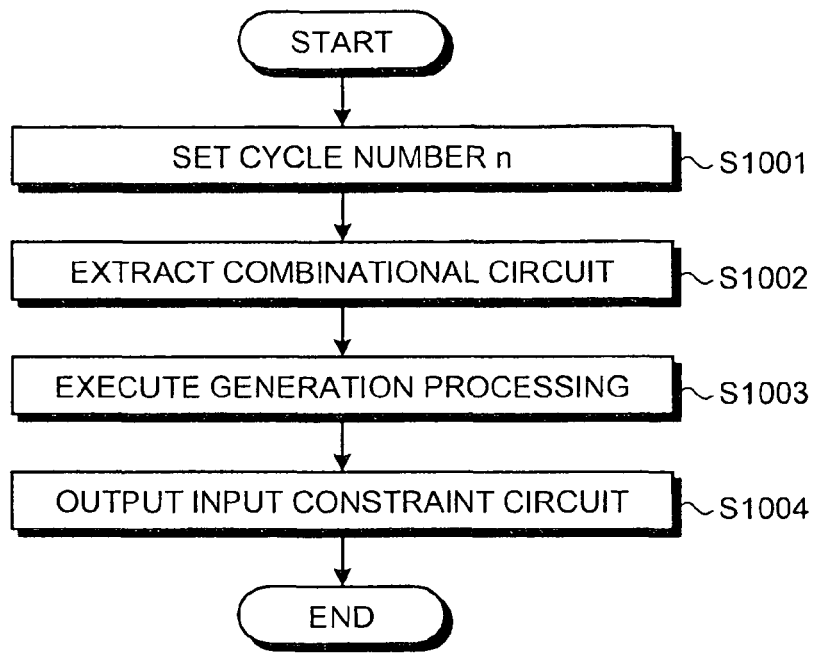
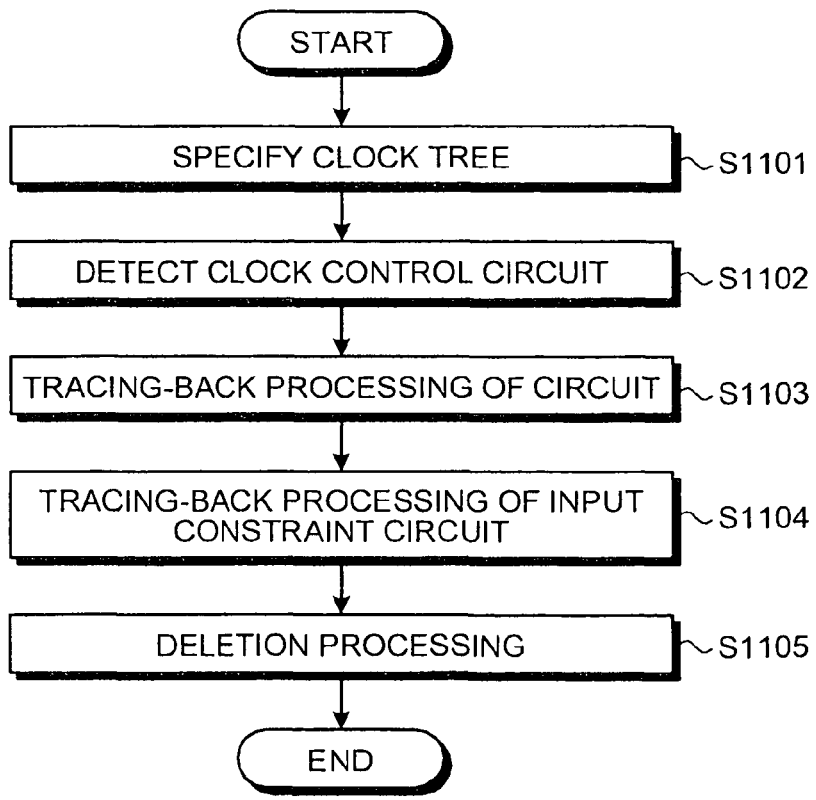

APPARATUS, METHOD, AND COMPUTER PRODUCT FOR ESTIMATING POWER CONSUMPTION OF LSI

CROSS-REFERENCE TO RELATED APPLICATIONS

This application is based upon and claims the benefit of priority from the prior Japanese Patent Application No. 2007-031868 filed on Feb. 13, 2007, the entire contents of which are incorporated herein by reference.

BACKGROUND OF THE INVENTION

1. Field of the Invention

The present invention relates to estimating large-scale integrated circuit (LSI) power consumption.

2. Description of the Related Art

In LSI circuits, electric power is consumed when an output signal from a device changes. When estimating the power consumption of an LSI at the design stage, how frequently the output signal from each device changes is estimated, and power consumption is estimated based on this value.

Among various power consumption values estimated at the design stage, the maximum power consumption is an important value. If the maximum power consumption is obtained, whether power supply is sufficiently assured or whether a temperature increase, even at a maximum, falls within a guaranteed operation temperature range can be verified by using this value.

When estimating the maximum power consumption at the design stage, the maximum operation ratio of operation ratios indicative of percentages of signal transition is first obtained, and the maximum operating power is estimated from this value. As techniques of estimating the maximum operation ratio, the following techniques have been proposed (see, for example, "Analysis of Maximum Switching Activities in Sequential Circuits for Power Supply Integrity Validation", ACM/IEEE International Workshop on Logic and Synthesis 2006).

FIG. 14 is a schematic of the first technique of estimating the maximum operation ratio. As shown in FIG. 14, according to the first technique, (1) values of flip-flop circuits (hereinafter, "FFs") in an LSI 1400 are set. (2) Then, simulation of a combinational circuit 1401 is executed by using the set values. (3) Subsequently, the number of times (signal transition number) that a signal from the combinational circuit 1401 changes is counted. Thereafter, (1) to (3) are repeatedly executed by changing the set values of the FFs.

Another technique involves using the first technique to some extent, storing the maximum operation ratio among the obtained ratios as a maximum operation ratio candidate, and then using the second technique to obtain an input pattern that provides an operation ratio greater than the maximum operation ratio candidate.

FIG. 15 is a schematic of the second technique of estimating the maximum operation ratio. As shown in FIG. 15, according to the second technique, (1) several simultaneous transition candidate points (indicated by marks x in FIG. 15), where the operation ratio increases when simultaneous transition occurs, are selected in the LSI 1400. (2) Then, based on a back calculation, it is confirmed whether an input value of the FF that induces simultaneous transition of the simultaneous transition candidate points is present.

(3) If an input value of the FF that induces simultaneous transition is present, a signal transition number is counted with respect to a pattern of the input value of the FF to calculate the operation ratio. (4) If the operation ratio calculated at (3) is higher than the maximum operation ratio candidate obtained by the first technique, the maximum operation ratio candidate is replaced by the currently selected simultaneous transition candidate point.

Thereafter, various simultaneous transition candidate points are selected, and (1) to (4) are repeatedly executed. Based on this operation, an FF input value pattern that provides a higher operation ratio is obtained. After sufficiently repeating this loop, the obtained maximum operation ratio candidate is regarded as the maximum operation ratio.

A third technique of adding a circuit that represents an input constraint before the LSI also exists (see, for example, "Symbolic Model Checking using SAT procedures instead of BDDs", DAC1999, pp. 317-320 2; and "Improved SAT-based Bounded Reachability Analysis", International Conference on VLSI Design 2002, pp. 729-734). According to this third technique, a circuit that represents an input constraint is generated and coupled before the LSI whose operation ratio is to be obtained.

FIG. 16 is a schematic of the first technique to which the third technique is applied, and FIG. 17 is a schematic of the second technique to which the third technique is applied. As shown in FIG. 16, (1) values of antecedent FFs, which are provided preceding a circuit representing input constraints 1601, are first set. (2) Then, simulation of the combinational circuit 1401 is executed by using the set values. At this time, the values of the FFs provided preceding the combinational circuit 1401 are set based on an output from the circuit representing input constraints 1601, and operation of the combinational circuit 1401 is simulated by using the set values. (3) Subsequently, the number of times (signal transition number) that a signal from the combinational circuit 1401 changes is counted.

Thereafter, the set values of the antecedent FFs are changed to repeatedly execute (1) to (3). According to the first technique having the third technique applied thereto, the values of the antecedent FFs are changed to count the signal transition in the combinational circuit 1401.

As shown in FIG. 17, (1) several simultaneous transition candidate points (indicated by marks x in FIG. 15) at which the operation ratio is increased when simultaneous transition occurs are first selected in the LSI. (2) Then, the presence of an input value of the antecedent FFs that induces simultaneous transition is confirmed by a back calculation.

(3) If the input value of the antecedent FFs that induces simultaneous transition is present, a signal transition number is counted with respect to a pattern of this input value of the FF to calculate an operation ratio. (4) If the operation ratio calculated at (3) is higher than the maximum operation ratio candidate obtained by the first technique, the maximum operation ratio candidate is replaced by the currently selected simultaneous transition candidate point.

According to the second technique to which the third technique is applied, whether a pattern of the values of the antecedent FFs that induces transition of a target circuit in the combinational circuit 1401 is present is checked.

However, according to the first technique, if the number of changes in signals can be counted with respect to all patterns of values of the FFs, a maximum value in operation ratios obtained from this counting can be acquired as the maximum operation ratio. In reality, 2n patterns of values of n FFs are present. Therefore, an enormous number of combinations are present, and hence covering all the combinations is difficult. That is, trying covering all the combinations results in a problem of increased design burden and a prolonged design period.

According to the second technique, a possibility of obtaining an operation ratio with respect to a pattern that is not actually present is increased. Specifically, when n FFs are present in the LSI, 2n patterns of values of these FFs are present, but all the patterns are not patterns that can be actually achieved.

2n becomes an enormous number if a value of n is large; however, for the majority of designs, only a very small part of patterns can be actually realized. Therefore, when the maximum operation ratio of the circuit is simply obtained, the possibility of acquiring an operation ratio with respect to a pattern that cannot be actually realized is increased. Accordingly, the maximum power consumption is estimated to be higher than the actual maximum power consumption, resulting in a factor of an operation failure.

FIG. 18 is a circuit diagram of an example of an input that is impossible in reality. As shown in FIG. 18, since an FF 1 and an input are inverted by an inverter INV, the FF 1 and an FF 2 do not take the same value. However, when a pattern that provides a maximum operation ratio is obtained, a pattern that the FF 1 and the FF 2 take the same value is attempted.

Therefore, when an operation ratio is the maximum in this pattern, this operation ratio is determined as the maximum operation ratio. As a result, an operation ratio higher than a true maximum operation ratio is rendered as the maximum operation ratio.

When applying the third technique, a designer must know what kind of constraints a value of the FF has in advance, and obtaining this input constraint is difficult, resulting in a problem of increased design burden and prolonged design period.

SUMMARY OF THE INVENTION

It is an object of the present invention to at least solve the above problems in the conventional technologies.

A computer-readable recording medium according to one aspect of the present invention stores therein an LSI analysis computer program and causes a computer to execute extracting a combinational circuit from a circuit having the combinational circuit and a cell group storing input/output values of the combinational circuit; generating an input constraint circuit representing an input constraint for the circuit by copying the combinational circuit in plural and coupling the resulting combinational circuits in series between an antecedent cell group and a subsequent cell group, each of which has the same configuration as the cell group; and an output unit that outputs the input constraint circuit.

An LSI analysis apparatus according to another aspect of the present invention includes an extracting unit that extracts a combinational circuit from a circuit having the combinational circuit and a cell group storing input/output values of the combinational circuit; a generating unit that generates an input constraint circuit representing an input constraint for the circuit by copying the combinational circuit in plural and coupling the resulting combinational circuits in series between an antecedent cell group and a subsequent cell group, each of which has the same configuration as the cell group; and an output unit that outputs the input constraint circuit.

An LSI analysis method according to still another aspect of the present invention includes extracting a combinational circuit from a circuit having the combinational circuit and a cell group storing input/output values of the combinational circuit; generating an input constraint circuit representing an input constraint for the circuit by copying the combinational circuit in plural and coupling the resulting combinational circuits in series between an antecedent cell group and a subsequent cell group, each of which has the same configuration as the cell group; and an output unit that outputs the input constraint circuit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is a flowchart of a first LSI analysis processing according to the embodiment of the present invention;

FIG. 11 is a flowchart of a second LSI analysis processing according to the embodiment of the present invention;

DETAILED DESCRIPTION OF THE PREFERRED EMBODIMENTS

Referring to the accompanying drawings, exemplary embodiments according to the present invention are explained in detail below.

Figure 1:
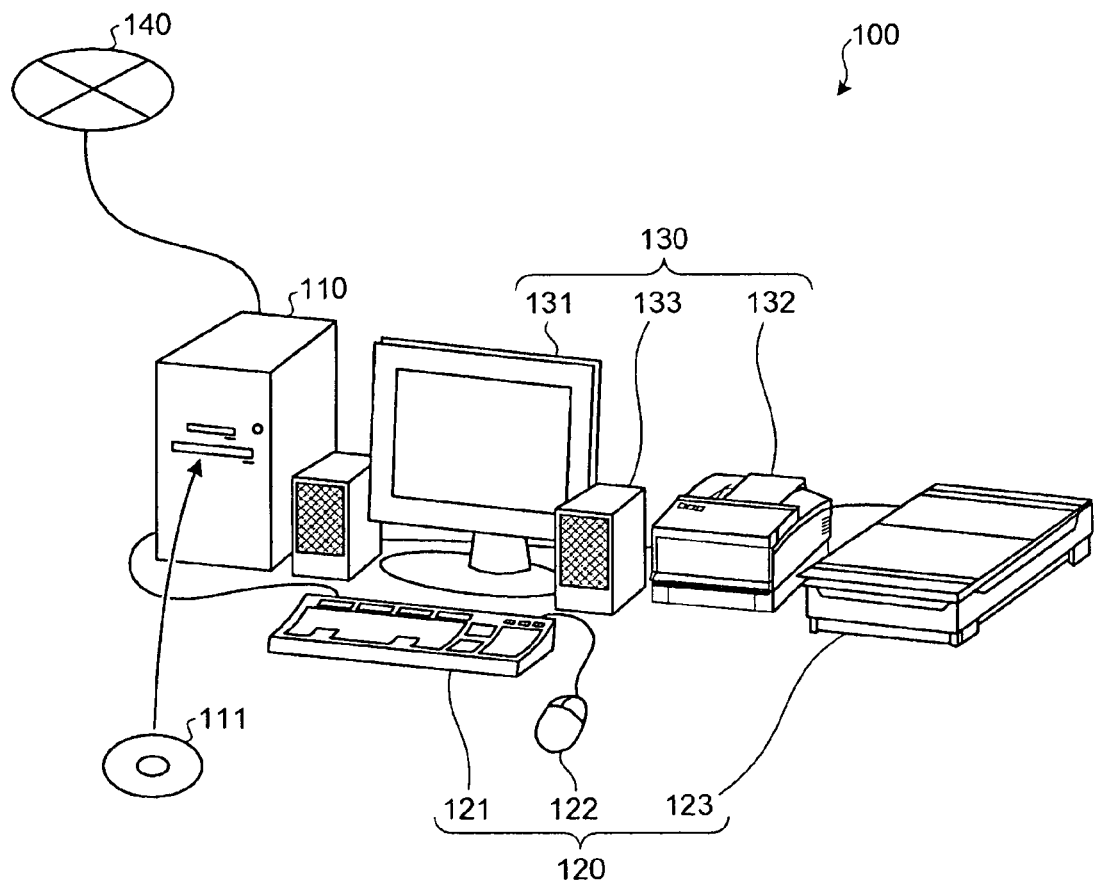
FIG. 1 is a block diagram of an LSI analysis apparatus according to an embodiment of the present invention.

FIG. 1 is a block diagram of an LSI analysis apparatus according to an embodiment of the present invention. As shown in FIG. 1, an LSI analysis apparatus 100 includes a computer 110, an input device 120, and an output device 130, and can be connected with a network 140, e.g., an LAN, a WAN, or the Internet through a non-depicted router or a modem.

The computer 110 has a CPU, a memory, and an interface. The CPU controls the entire LSI analysis apparatus 100. The memory is formed of, for example, read-only memory (ROM), a random access memory (RAM), a hard disk (HD), an optical disk 111, or a flash memory. The memory is used as a work area for the CPU.

Various programs are stored in the memory and loaded in response to a command from the CPU. The reading/writing data from/into the HD and the optical disk 111 is controlled by a disk drive. The optical disk 111 and the flash memory are removable. The interface controls input from the input device 120, output to the output device 130, and transmission/reception with respect to the network 140.

As the input device 120, a keyboard 121, a mouse 122, and a scanner 123 are adopted. The keyboard 121 includes keys to input, for example, characters, numeric figures, and various kinds of instructions, and data is input through the keyboard 121. The keyboard 121 may be a touch panel type. The mouse 122 is used to move a cursor, select a range, move a window, or change a window size. The scanner 123 optically reads an image as image data, which is stored in the memory of the computer 110. The scanner 123 may have an optical character recognition (OCR) function.

As the output device 130, a display 131, a printer 132, a speaker 133, and others are adopted. The display 131 displays a cursor, an icon, or a tool box as well as data, such as text, an image, and function information. The printer 132 prints image data or text data. The speaker 133 outputs sound, e.g., a sound effect or a text-to-voice converted sound.

Figure 2:
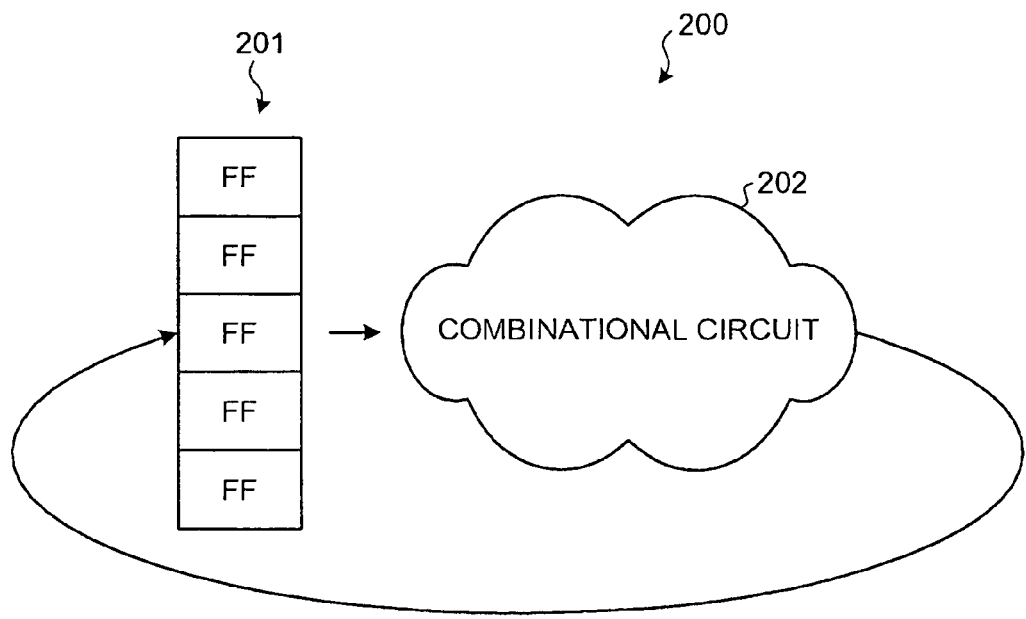
FIG. 2 is a schematic of a circuit subject to analysis.

FIG. 2 is a schematic of a circuit subject to analysis. A circuit 200 that is subject to analysis has a combinational circuit 202 and a cell group 201 that stores values of inputs/outputs with respect to the combinational circuit 202. Each cell constituting the cell group 201 is formed of a sequential circuit element, e.g., a flip-flop ("FF" in FIG. 2). Specifically, the circuit 200 is a synchronous circuit that repeats an operation of transmitting a value stored in each FF to the combinational circuit 202 and storing a signal output from the combinational circuit 202 in each FF based on the next clock, thereby completing one cycle.

Figure 3:
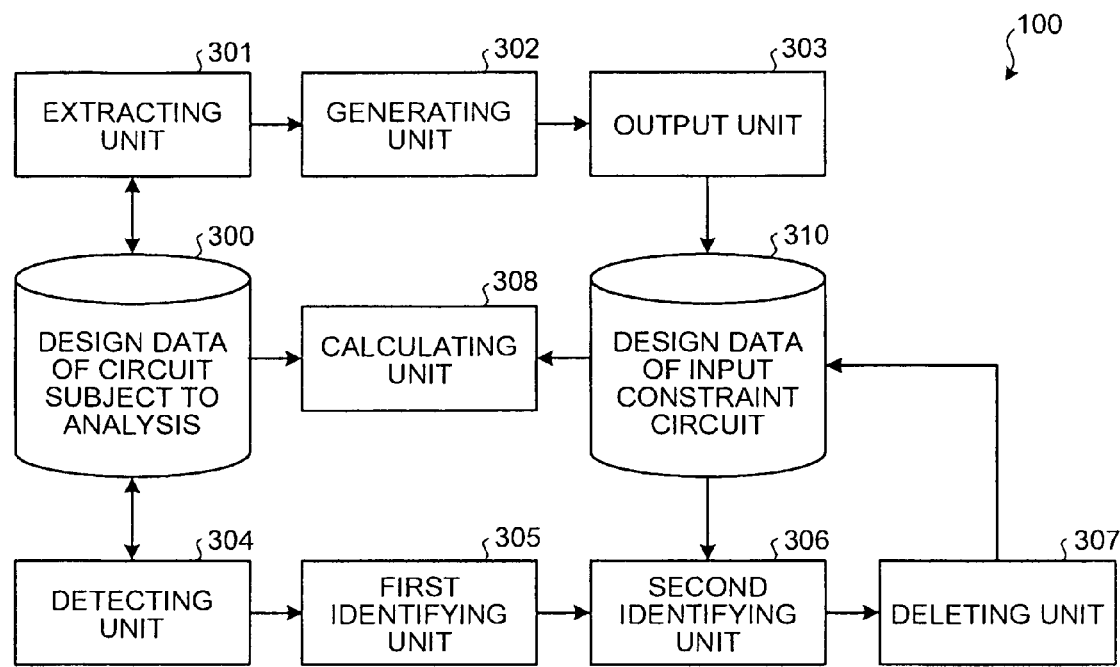
FIG. 3 is a functional diagram of the LSI analysis apparatus.

FIG. 3 is a functional diagram of the LSI analysis apparatus 100. As shown in FIG. 3, the LSI analysis apparatus 100 includes an extracting unit 301, a generating unit 302, an output unit 303, a detecting unit 304, a first identifying unit 305, a second identifying unit 306, a deleting unit 307, and a calculating unit 308.

The respective functions of the units 301 to 308 can be implement by the CPU executing a corresponding program stored in the memory. Output data from the respective units 301 to 308 is stored in the memory. The connection destinations, indicated by the arrows in FIG. 3, read the output data of the connection sources from the memory, and the CPU executes a corresponding program.

As shown in FIG. 3, the extracting unit 301 first extracts the combinational circuit 202 from the circuit 200. Specifically, design data of the combinational circuit 202 is extracted from design data 300 of the circuit 200. Here, the design data 300 of the circuit 200 is a netlist concerning the circuit 200, and a netlist corresponding to the combinational circuit 202 is extracted as the design data of the combinational circuit 202 by reference to the netlist. The extracted design data is stored in the memory.

The generating unit 302 reads the design data stored in the memory, copies the combinational circuit 202, and connects the resulting copies of the combinational circuit 202 (corresponding in number to a given number of cycles) in series between an antecedent cell group preceding the combinational circuits 202 and a subsequent cell group subsequent the combinational circuits. Both the antecedent cell group and the subsequent cell group have the same configuration as the cell group 201. Specific generation processing by the generating unit 302 will now be explained with reference to the drawing.

Figure 4:
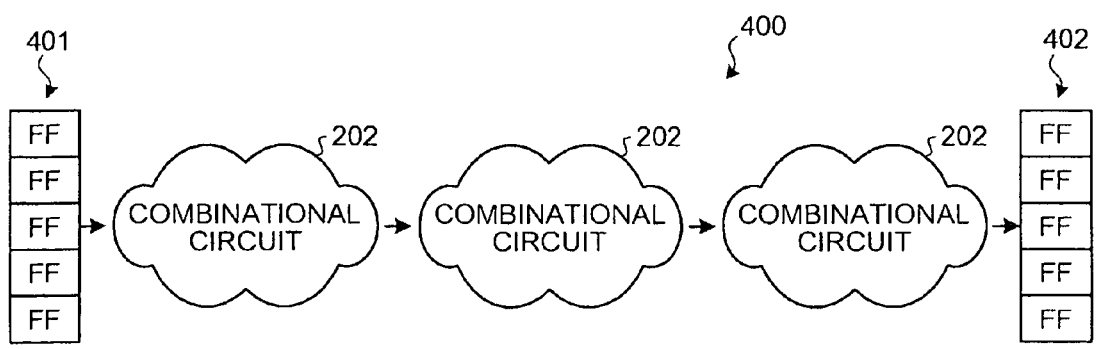
FIG. 4 is a schematic of generation processing by a generating unit.

FIG. 4 is a schematic of generation processing by the generating unit 302. As shown in FIG. 4, design data of the cell group 201 depicted in FIG. 2 is copied to obtain design data of an antecedent cell group 401 and design data of a subsequent cell group 402. Design data of the combinational circuit 202 is copied to generate the combinational circuits 202 in plural corresponding to a given number of cycles n (n=2, 3, 4 . . . , where n=3 in FIG. 4).

The design data of the combinational circuits 202 are connected in series from the design data of the antecedent cell group 401. The design data of the subsequent cell group 402 is coupled with the design data of the combinational circuit 202 at the end of the series. As a result, design data 310 of an input constraint circuit 400 representing an input constraint(s) of the circuit 200 can be generated.

The output unit 303 outputs the input constraint circuit 400 obtained by the generating unit 302. Specifically, the output unit 303 stores the design data 310 of the input constraint circuit 400 in the memory or displays it on the display 131. As a result, if the original design data 300 of the circuit 200 is present, a designer can automatically obtain the input constraint circuit 400 without trial and error.

When an input pattern is input to the antecedent cell group 401 of the input constraint circuit 400, the value that is output to the subsequent cell group 402 is supplied to the cell group 201 of the circuit 200 as a constrained input pattern. As a result, simulation of the combinational circuit 202 of the circuit 200 is executed and the FFs that demonstrate transition are counted, thereby obtaining a maximum operation ratio.

The merits of using a circuit acquired by generating the combinational circuit 202 corresponding to n cycles as the input constraint circuit 400 include the following. Even if a first input is a pattern that cannot be realized, obtaining a feasible pattern in the middle of the cycles can be expected.

Figure 18:
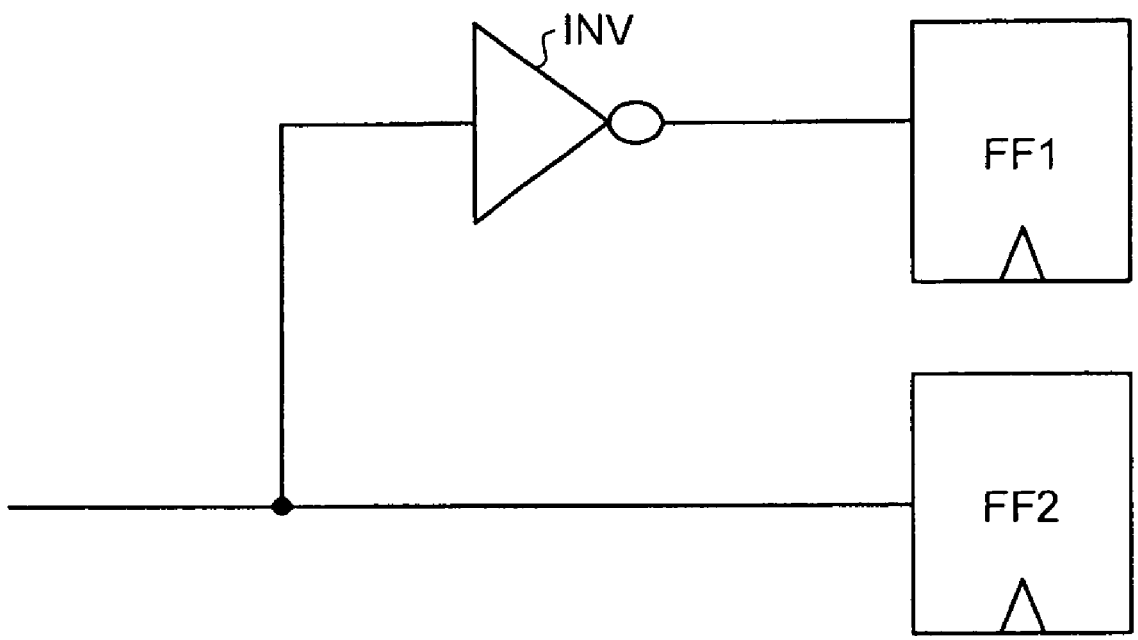
FIG. 18 is a circuit diagram of an example of an input that is impossible in reality.

For example, under such simple constraint conditions as shown in FIG. 18, the FF 1 and the FF 2 after the first cycle always have different values. Therefore, a value obtained as the maximum operation ratio is restricted to a situation where the FF 1 and the FF 2 have different values. The input constraint circuit 400 obtained as a result of generation for n cycles has a merit in that, although the input constraint is not precisely represented, the input constraint can be reflected to some extent without complicated circuit analysis.

When generation for two cycles or more is performed, an initial state of the circuit 200 may be achieved within n cycles. In this case, when such a simple generation process as that shown in FIG. 4 is used, although the circuit 200 may enter this state (initial state), values of corresponding FFs are not present, and they may be eliminated as an unfeasible combination. A value corresponding to the initial state is provided when the operation is performed for 2 to n cycles to prevent this problem.

Figure 5:
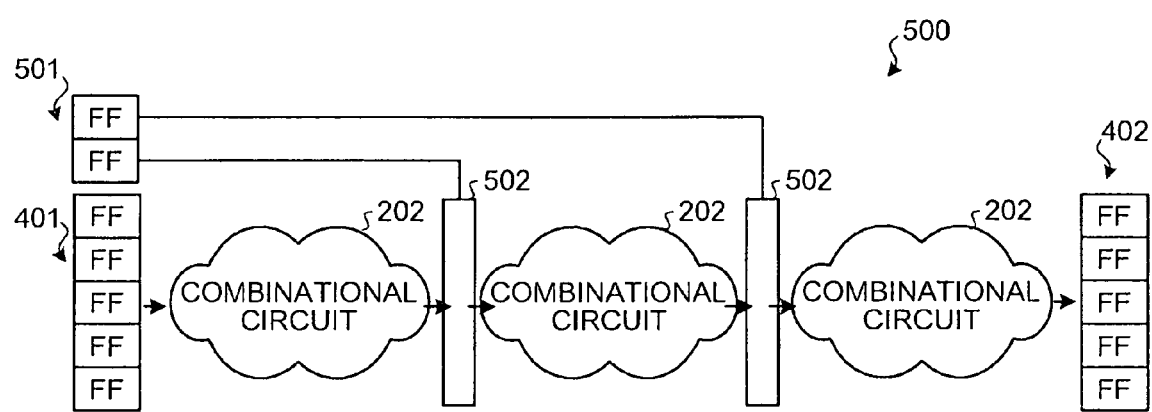
FIG. 5 is a schematic of an input constraint circuit taking an initial state into consideration.

FIG. 5 is a schematic of an input constraint circuit taking the initial state into consideration. As shown in FIG. 5, selectors 502 and a selector control FF group 501 that switches the selectors 502 are inserted between the combinational circuits 202, thereby obtaining an input constraint circuit 500.

In the input constraint circuit 500, when a value of an FF in the selector control FF group 501 is 1, the selector 502 outputs a value of an FF in the initial state of the circuit 200 to the subsequent combinational circuit 202. On the other hand, when a value of the FF in the selector control FF group 501 is 0, the selector 502 supplies the output of the antecedent combinational circuit 202 as it is to the subsequent combinational circuit 202.

When an input pattern is supplied to the antecedent cell group 401 and the selector control FF group 501 of the input constraint circuit 500, a value output to the subsequent cell group 402 is supplied to the cell group 201 of the circuit 200 as a constrained input pattern. As a result, simulation of the combinational circuit 202 of the circuit 200 can be executed, and the FFs that demonstrate transition can be counted, thereby obtaining a maximum operation ratio.

The detecting unit 304 detects clock control circuits from the combinational circuits 202 in the circuit 200. The clock control circuits are present in the circuit 200. When a clock is stopped by the clock control circuit, extensive circuits stop operations at the same time, greatly affecting the operation ratio.

Therefore, in the clock control circuits, if operation patterns of circuits in which clocks may potentially be stopped can be grasped, the effect on other parts becomes relatively small, and hence the operation ratio of the entire circuit 200 can be efficiently estimated. Therefore, specifically, in the detecting unit 304, a designer specifies a clock tree of the circuit 200.

Figure 6:
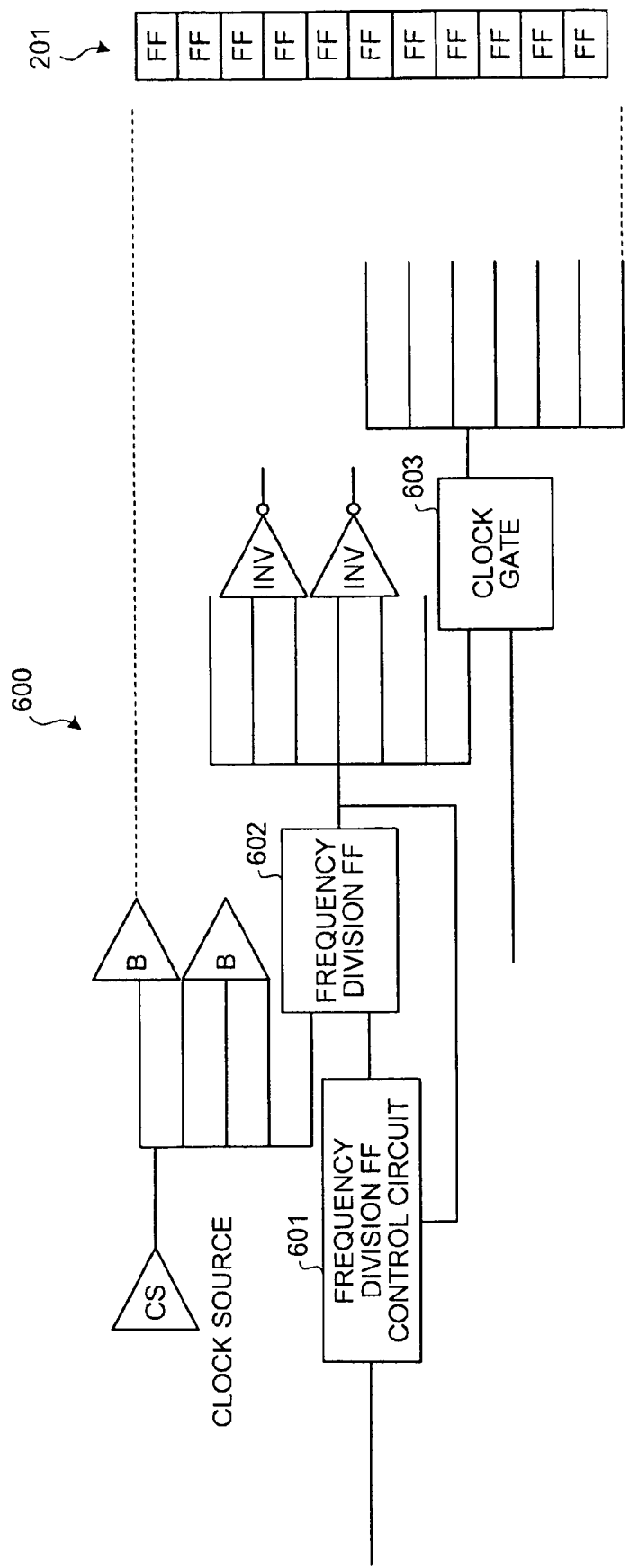
FIG. 6 is a schematic of a clock tree of the circuit.

FIG. 6 is a schematic of a clock tree of the circuit 200. As shown in FIG. 6, if cells other than buffers B or inverters INV are present in a clock tree 600, design data of these cells is detected as design data of clock control circuits, for example, a frequency division FF control circuit 601, a frequency division FF 602 controlled by the frequency division FF control circuit 601, or a clock gate 603. The clock gate 603 is, for example, a buffer that stops the switching of a period clock having an asserted enable signal. The detected design data of the clock control circuits is stored in the memory.

The first identifying unit 305 traces back the clock control circuits detected by the detecting unit 304 to the cell group 201 in the circuit 200 to identify a cell that supplies a signal to the clock control circuits from the cell group 201 in the circuit 200. Identification processing by the first identifying unit 305 will now be explained with reference to FIG. 7.

Figure 7:
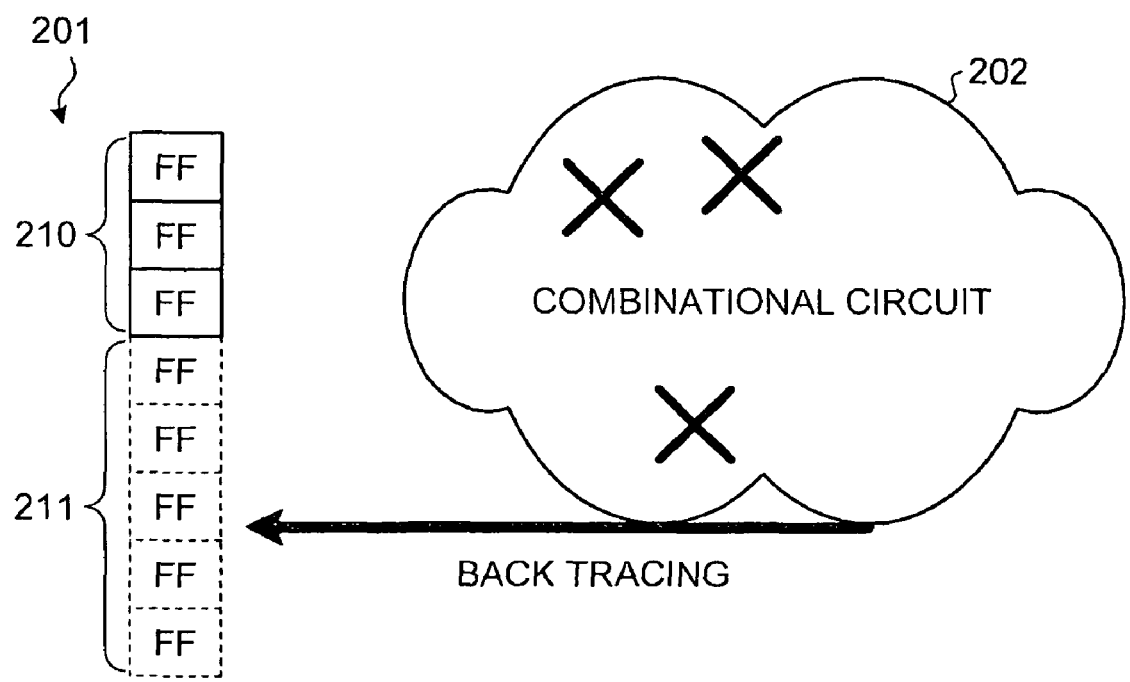
FIG. 7 is a schematic of identification processing by a first identifying unit.

FIG. 7 is a schematic of identification processing by the first identifying unit 305. As shown in FIG. 7, each mark x denotes an input terminal of the clock control circuit detected by the detecting unit 304. Tracing back a signal line from the input terminals enables identification of a cell that supplies a signal to the clock control circuit from the cell group 201 in the circuit 200. Reference numeral 210 in FIG. 7 denotes a group of identified cells ("identified cell group"). Reference numeral 211 designates a group of non-identified cells ("non-identified cell group").

As shown in FIG. 3, the second identifying unit 306, to identify a cell, among the antecedent cell group 401, that supplies a signal to the cell identified by the first identifying unit 305 (hereinafter, "identified subsequent cell"), traces back the input constraint circuit 400 or 500 from a cell among the subsequent cell group 402 that is equivalent to the identified subsequent cell to the antecedent cell group 401. Identification processing by the second identifying unit 306 will now be explained with reference to FIG. 8.

Figure 8:
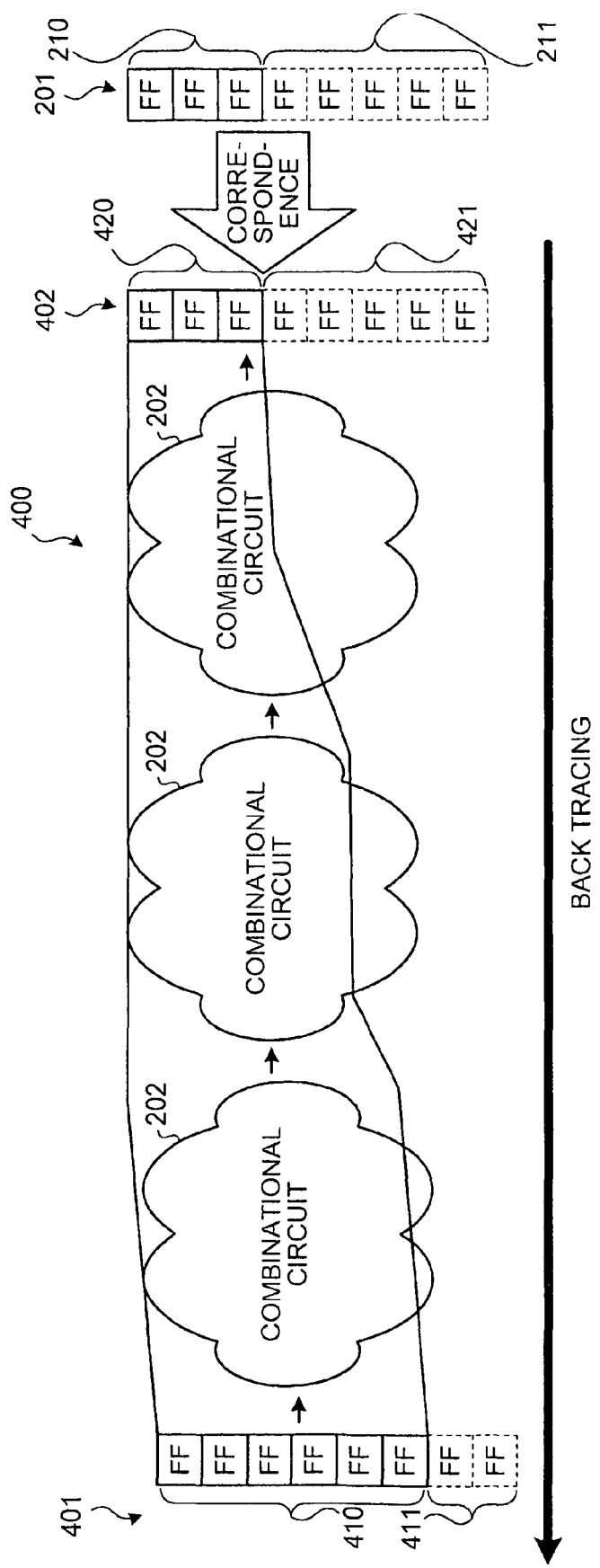
FIG. 8 is a schematic of identification processing by a second identifying unit.

FIG. 8 is a schematic of identification processing by the second identifying unit 306. As shown in FIG. 8, since the subsequent cell group 402 has the same configuration as the cell group 201 of the circuit 200, the identified cell group 210 in the cell group 201 of the circuit 200 corresponds to an identified cell group 420 of the subsequent cell group 402, and the non-identified cell group 211 in the cell group 201 of the circuit 200 corresponds to a non-identified cell group 421 of the subsequent cell group 402.

In the input constraint circuit 400, tracing back a signal line from each cell in the identified cell group 420 enables, for each of the cells in the identified cell group 420, identification of a cell (among the antecedent cell group 401) that respectively supplies a signal. Reference numeral 410 in FIG. 8 designates an identified cell group. The identified cell will be referred to as an "identified antecedent cell". Reference numeral 411 denotes a non-identified cell group.

As shown in FIG. 3, the deleting unit 307 deletes a signal transmission path from a cell identified by the second identifying unit 306 to an identified subsequent cell from the input constraint circuit 400 or 500. Specific deletion processing by the deleting unit 307 will now be explained with reference to FIG. 9.

Figure 9:
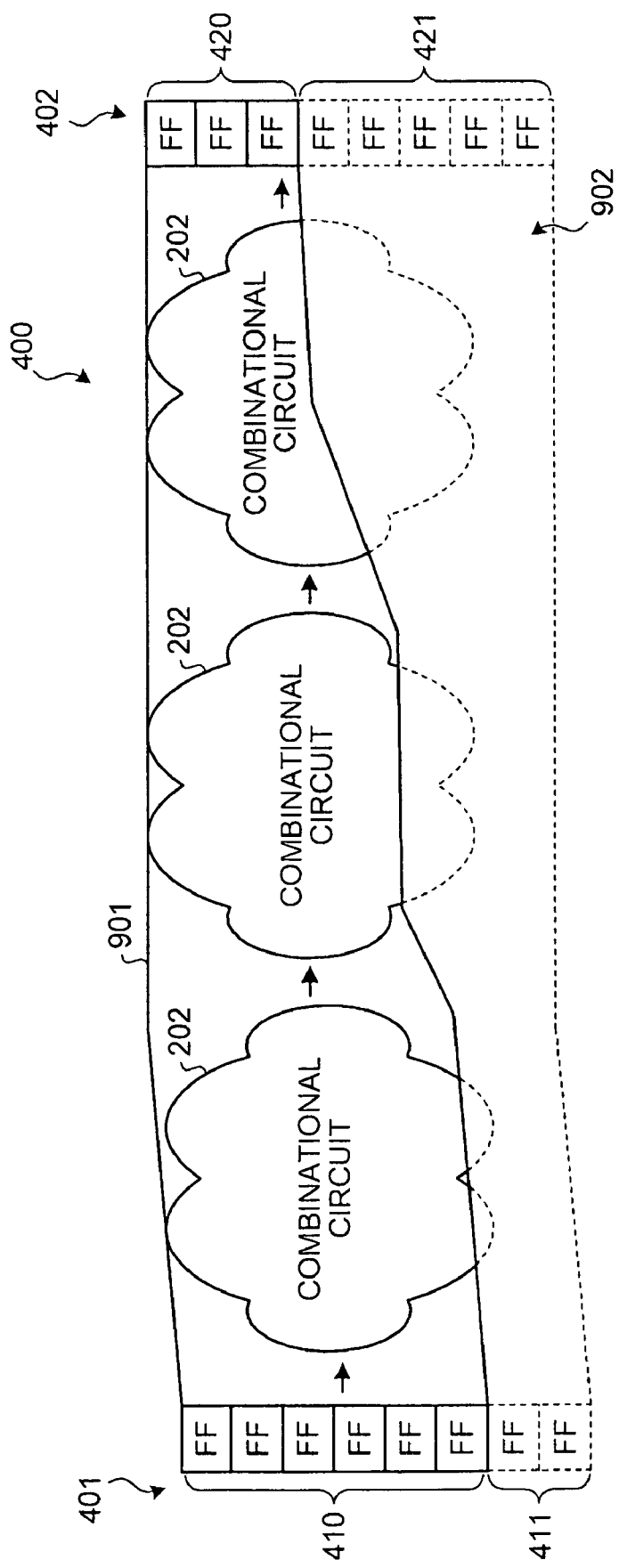
FIG. 9 is a schematic of deletion processing by a deleting unit.

FIG. 9 is a schematic of deletion processing by the deleting unit 307. In the deleting unit 307, a circuit 902 other than an input constraint circuit 901 serving as a signal transmission path from the (antecedent) identified cell group 410 to the (subsequent) identified cell group 420 does not affect the clock control circuit in the circuit 200.

Therefore, when the circuit 902 serving as the signal transmission path from the non-identified cell group 411 to the non-identified cell group 421 is deleted from the input constraint circuit 400, the input constraint circuit 901 that affects the clock control circuit can be extracted. Hence, even if the circuit scale of the input constraint circuit 400 is increased by generating the combinational circuit 202, deleting an unnecessary part (circuit 902) enables improvement of the operation ratio analysis speed.

As shown in FIG. 3, the calculating unit 308 calculates the maximum power consumption of the circuit 200 based on the input constraint circuit 400, 500, or 901. Specifically, in case of the input constraint circuit 400, a value that is output to the subsequent cell group 402 by giving an input pattern to the antecedent cell group 401 is supplied to the cell group 201 in the circuit 200 as a constrained input pattern.

In case of the input constraint circuit 500, a value that is output to the subsequent cell group 402 by giving an input pattern to the antecedent cell group 401 and the selector control FF group 501 is supplied to the cell group 201 of the circuit 200 as a constrained input pattern.

In case of the input constraint circuit 901, a value that is output to the identified cell group 420 by giving an input pattern to the identified cell group 410 is supplied to the cell group 201 of the circuit 200 as a constrained input pattern.

As a result, simulation of the combinational circuit 202 in the circuit 200 is executed, and the FFs that demonstrate transition are counted, thereby obtaining the maximum operation ratio. When the maximum operation ratio is obtained, the maximum power consumption can be acquired. The calculation processing by this calculating unit 308 can be executed based on the existing technique explained in "Description of the Related Art".

FIG. 10 is a flowchart of a first LSI analysis processing according to the embodiment of the present invention. The first LSI analysis processing involves use of the extracting unit 301, the generating unit 302, and the output unit 303 to generate the input constraint circuit depicted in FIG. 4 or FIG. 5.

As shown in FIG. 10, a cycle number n for generation of the combinational circuit 202 is first set (step S1001). The cycle number n is specified by a designer, or a default value is used. The extracting unit 301 extracts the combinational circuit 202 from the circuit 200 (step S1002). The generating unit 302 executes generation processing (step S1003), and the output unit 303 outputs the input constraint circuit 400 or 500 as a generation result (step S1004).

FIG. 11 is a flowchart of a second LSI analysis processing according to the embodiment of the present invention. The second LSI analysis processing involves the use of the detecting unit 304, the first identifying unit 305, the second identifying unit 306, and the deleting unit 307 to generate the input constraint circuit 901 depicted in FIG. 9 from the input constraint circuit 400 depicted in FIG. 4.

As shown in FIG. 11, the clock tree 600 in the circuit 200 is first specified (step S1101). Then, the detecting unit 304 detects the clock control circuits from the circuit 200 by reference to the specified clock tree 600 (step S1102). The first identifying unit 305 executes tracing-back processing of the circuit 200 (step S1103) and then the second identifying unit 306 executes tracing-back processing of the input constraint circuit 400 (step S1104).

Thereafter, the deleting unit 307 deletes the circuit 902 that does not affect the clock control circuits from the input constraint circuit 400 (step S110S), enabling extraction of the input constraint circuit 901 that affects the clock control circuits.

Figure 12:
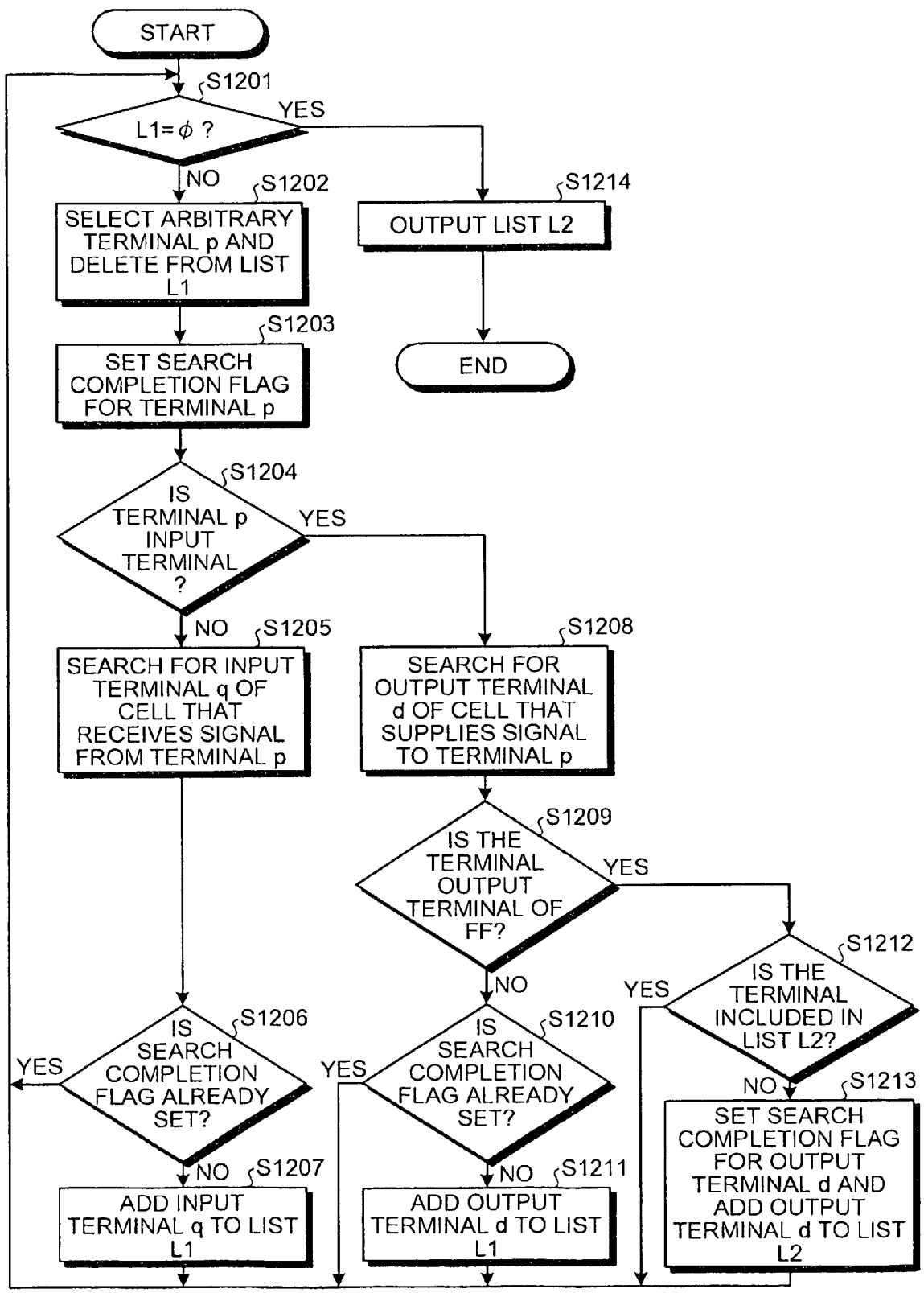
FIG. 12 is a flowchart of the tracing-back processing at step S1103 and step S1104.

FIG. 12 is a flowchart of the tracing-back processing at step S1103 and step S1104. As shown in FIG. 12, whether a tracing-back list L1 is an empty set is judged (step S1201). The tracing-back list L1 is a group of terminal candidates serving as points where tracing-back processing starts. If L1=Ø is not true (step S1201: NO), an arbitrary terminal p is selected from the tracing-back list L1 and deleted from the tracing-back list L1 (step S1202). A search completion flag is set for the terminal p (step S1203).

Subsequently, whether the terminal p is an input terminal is judged (step S1204). If the terminal p is not the input terminal (step S1204: NO), the input terminal q of the cell that receives a signal from the terminal p is searched for (step S1205). Whether the search completion flag is set for the input terminal q is checked (step S1206).

When the search completion flag is set (step S1206: YES), the process returns to step S1201. When the search completion flag is not set (step S1206: NO), the input terminal q is added to the tracing-back list L1 (step S1207), and the process returns to step S1201.

On the other hand, when the terminal p is the input terminal at step S1204 (step S1204: YES), an output terminal (driver pin) d of the cell that supplies a signal to the terminal p is searched for (step S1208). This processing is the tracing-back processing. Whether the output terminal d is an output terminal of the FF is judged (step S1209). If the output terminal d is not the output terminal of the FF (step S1209: NO), whether the search completion flag is set for this output terminal d is checked (step S1210).

When the search completion flag is set (step S1210: YES), the process returns to step S1201. When the search completion flag is not set (step S1210: NO), the output terminal d is added to the tracing-back list L1 (step S1211), and the process returns to step S1201.

On the other hand, when the output terminal d is the output terminal of the FF at step S1209 (step S1209: YES), whether the output terminal d is included in an output list L2 is judged (step S1212). The output list L2 is a group of terminals that are acquired as results of the tracing-back processing. When the output terminal d is already included in the output list L2 (step S1212: YES), the process returns to step S1201.

When the output terminal d is not included in the output list L2 (step S1212: NO), the search completion flag is set for the output terminal d, and the output terminal d is added to the output list L2 (step S1213). The process returns to step S1201.

When L1=Ø is true at step S1201 (step S1201: YES), the output list L2 is output (step S1214). Then, a series of tracing-back processing is terminated.

When using this tracing-back processing procedure at step S1103, the tracing-back list L1 in the initial state serves as an input terminal of each clock control circuit detected at step S1102. The output list L2 includes output terminals of the identified cell group 210 in the cell group 201 of the circuit 200.

When using this tracing-back processing procedure at step S1104, the tracing-back list L1 in the initial state includes an input terminal of the same FF (FF in the identified cell group 420 depicted in FIG. 8) as the FF having each output terminal in the output list L1 obtained by the tracing-back processing at step S1103. The output list L2 includes the output terminals of the identified cell group 410 in the antecedent cell group 401 in the input constraint circuit 400.

Figure 13:
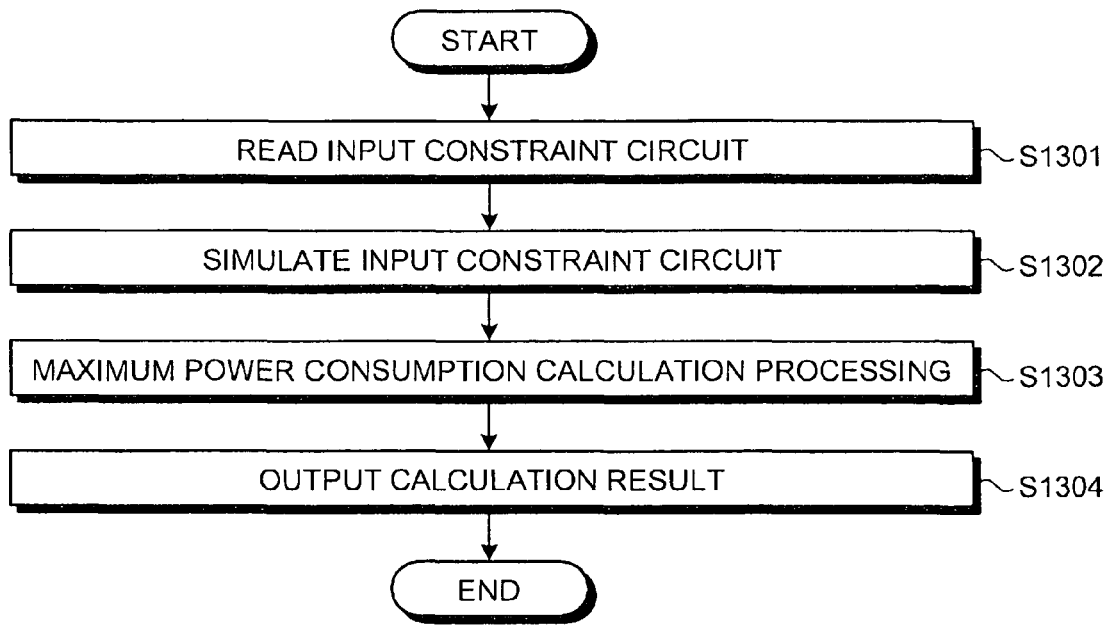
FIG. 13 is a flowchart of a third LSI analysis processing procedure according to the embodiment of the present invention.
Figure 14:
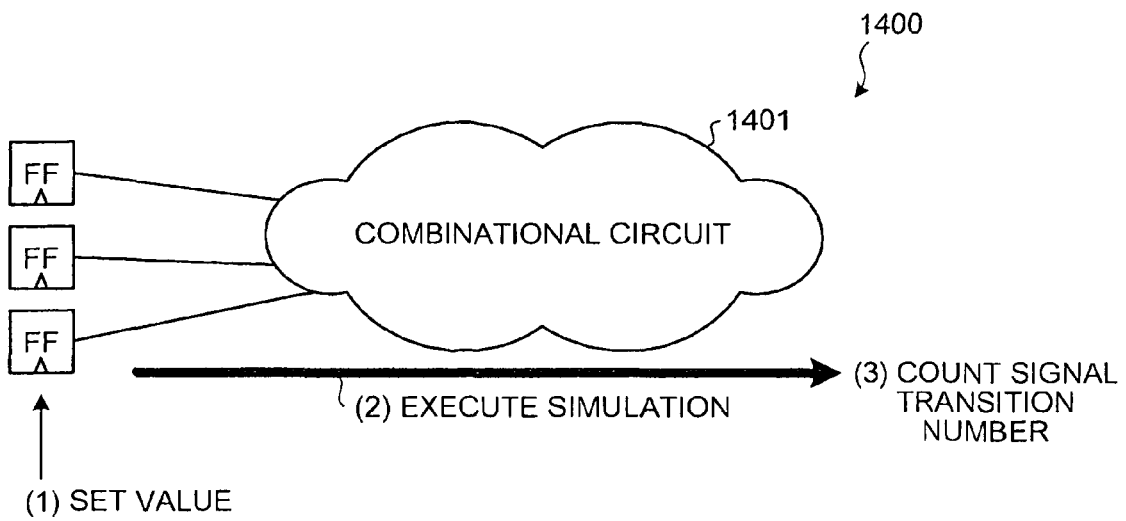
FIG. 14 is a schematic of a first technique of estimating the maximum operation ratio.
Figure 15:
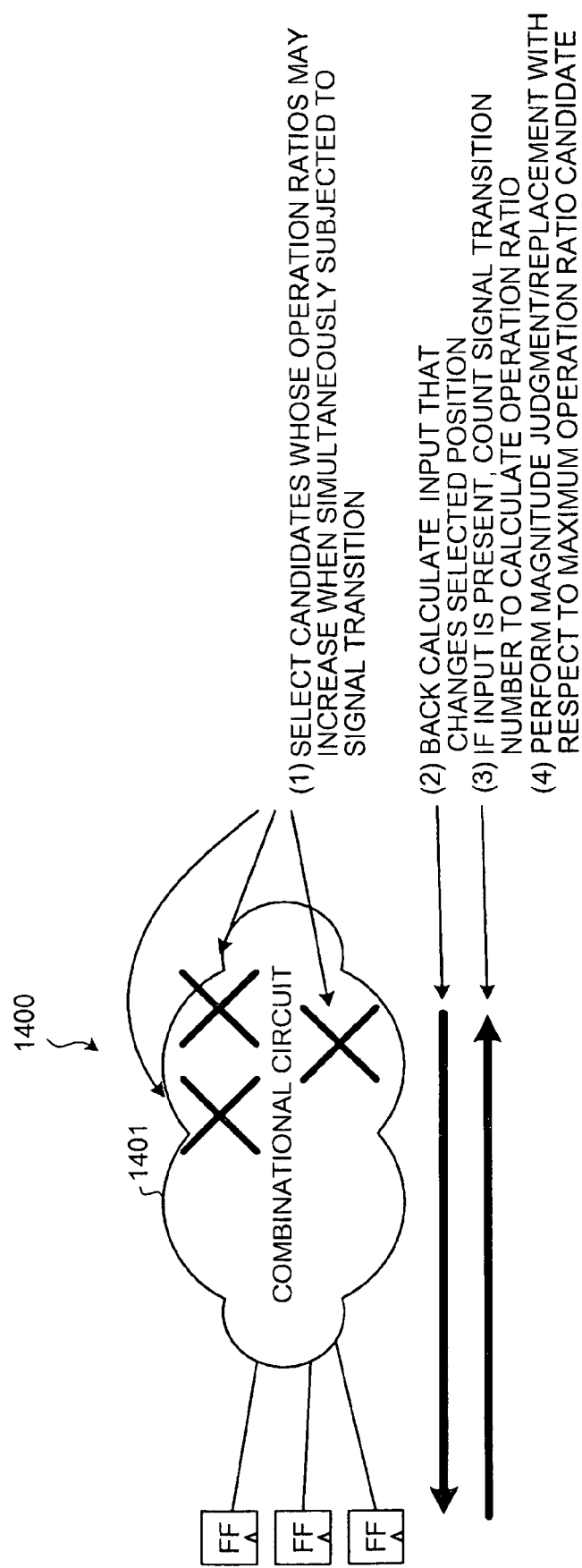
FIG. 15 is a schematic of a second technique of estimating the maximum operation ratio.
Figure 16:
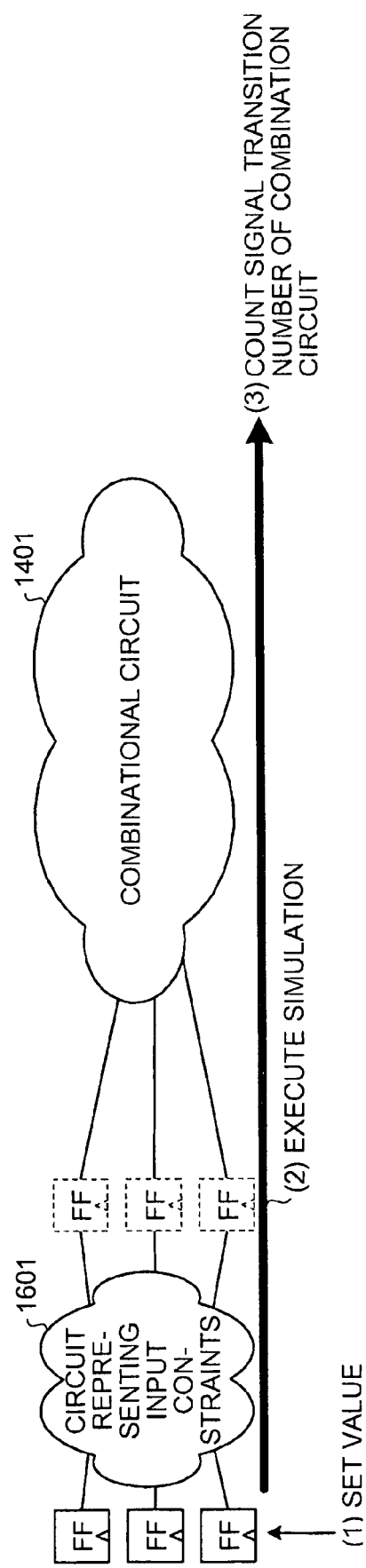
FIG. 16 is a schematic of the first technique to which a third technique is applied.
Figure 17:
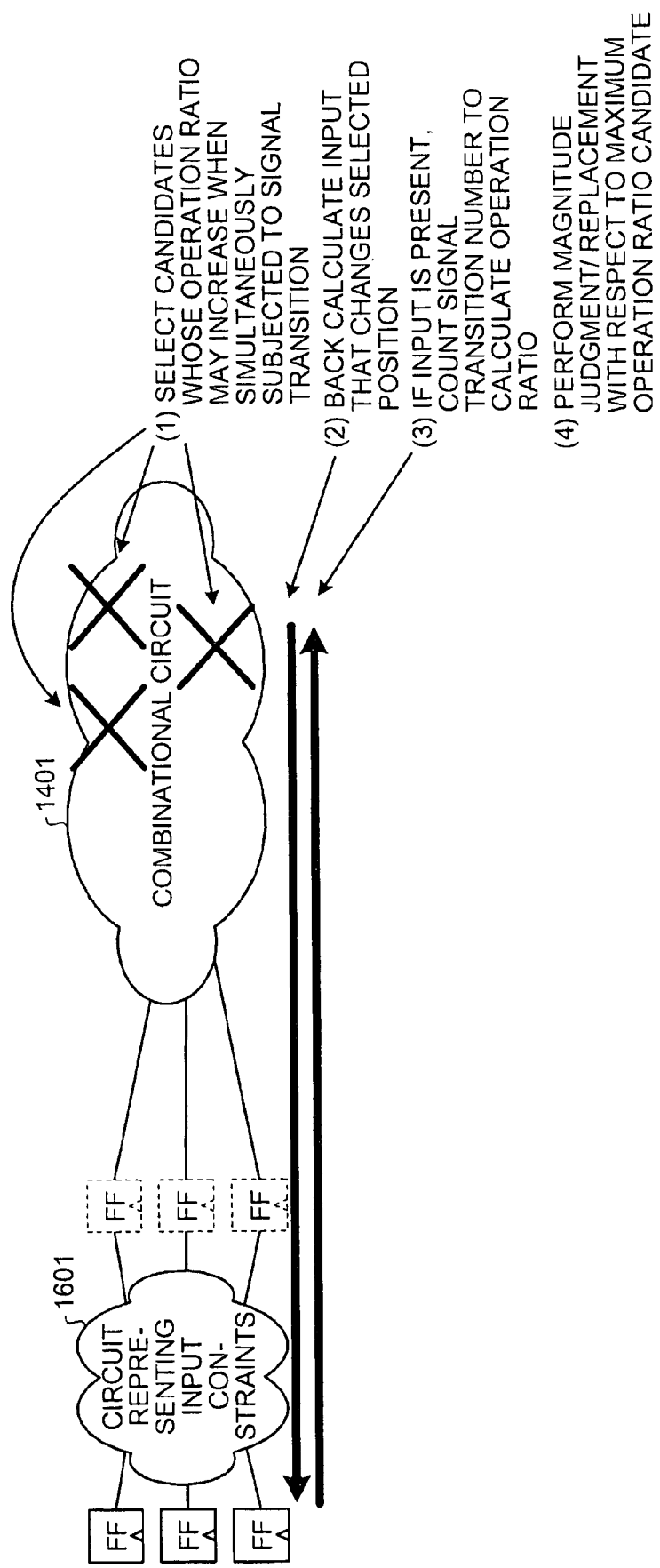
FIG. 17 is a schematic of the second technique to which the third technique is applied.

FIG. 13 is a flowchart of a third LSI analysis processing procedure according to the embodiment of the present invention. As shown in FIG. 13, the input constraint circuit 400 data (or may be 500 or 901) is read (step S1301), an input pattern is supplied to the antecedent cell group 401, and the input constraint circuit 400 is simulated (step S1302). The calculating unit 308 calculates the maximum power consumption of the circuit 200 (step S1303). Then, a calculation result is output (step S1304), thereby terminating a series of processing.

As explained above, according to this embodiment, when the circuit generated for n cycles is used as the input constraint circuit, the possibility of obtaining an operation ratio with respect to an actually unfeasible input pattern can be reduced without the trouble of acquiring a precise input constraint, thus estimating a realistic maximum operation ratio or maximum power consumption. As a result, a reduction in design burden, a shortened a design period, and improved a design quality can be effected.

The LSI analysis method explained in the present embodiment can be implemented by a computer such as a personal computer and a workstation executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

As explained above, according to the embodiment, maximum power consumption can be efficiently and accurately estimated, thereby enabling reduced design burden, a shortened design period, and improved a design quality.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium storing therein an LSI analysis computer program that causes a computer to execute:
    extracting a combinational circuit from a circuit having the combinational circuit and a cell group storing input/output values of the combinational circuit;
    generating an input constraint circuit including an antecedent cell group and a subsequent cell group, and representing an input constraint for the circuit by copying the combinational circuit in plural and coupling the plural copied combinational circuits and a selector so that the selector is between an antecedent combinational circuit and a subsequent combinational circuit among the plural copied combinational circuits and the plural copied combinational circuits and the selector are coupled in series between an antecedent cell group and a subsequent cell group, each of which has the same configuration as the cell group; and an output unit that outputs the input constraint circuit, wherein the selector enables switching of an input to the subsequent combinational circuit to any one of an initial value input of a sequential circuit in the circuit and an output from the antecedent combinational circuit.

2. The non-transitory computer-readable recording medium according to claim 1, further comprising:

detecting a clock control circuit from the combinational circuit in the circuit;

identifying, by tracing-back from the clock control circuit to the cell group of the circuit, a first cell there among that supplies a signal to the clock control circuit;

identifying, by tracing-back the input constraint circuit from an identified cell among the subsequent cell group to the antecedent cell group, a second cell there among that supplies a signal to the identified cell corresponding to the first cell; and deleting, from the input constraint circuit, a signal transmission path between the first cell and the second cell.

3. The non-transitory computer-readable recording medium according to claim 1, further comprising calculating a maximum power consumption of the circuit using the input constraint circuit.

4. An LSI analysis apparatus comprising:

an extracting unit that extracts a combinational circuit from a circuit having the combinational circuit and a cell group storing input/output values of the combinational circuit;

a generating unit that generates an input constraint circuit representing an input constraint for the circuit by copying the combinational circuit in plural and coupling the plural copied combinational circuits and a selector so that the selector is between an antecedent combinational circuit and a subsequent combinational circuit among the plural copied combinational circuits and the plural copied combinational circuits and the selector are coupled in series between an antecedent cell group and a subsequent cell group, each of which has the same configuration as the cell group; and an output unit that outputs the input constraint circuit, wherein the selector enables switching of an input to the subsequent combinational circuit to any one of an initial value input of a sequential circuit in the circuit and an output from the antecedent combinational circuit.

5. The LSI analysis apparatus according to claim 4, further comprising:

a detecting unit that detects a clock control circuit from the combinational circuit in the circuit;

a first identifying unit that, by tracing-back from the clock control circuit to the cell group of the circuit, identifies a first cell there among that supplies a signal to the clock control circuit;

a second identifying unit that, by tracing-back the input constraint circuit from an identified cell among the subsequent cell group to the antecedent cell group, identifies a second cell there among that supplies a signal to the identified cell corresponding to the first cell; and a deleting unit that deletes, from the input constraint circuit, a signal transmission path between the first cell and the second cell.

6. The LSI analysis apparatus according to claim 4, further comprising a calculating unit that calculates a maximum power consumption of the circuit using the input constraint circuit.

7. An LSI analysis method comprising:

extracting, via a CPU, a combinational circuit from a circuit having the combinational circuit and a cell group storing input/output values of the combinational circuit;

generating, via the CPU, an input constraint circuit representing an input constraint for the circuit by copying the combinational circuit in plural and coupling the plural copied combinational circuits and a selector so that the selector is between an antecedent combinational circuit and a subsequent combinational circuit among the plural copied combinational circuits and the plural copied combinational circuits and the selector are coupled in series between an antecedent cell group and a subsequent cell group, each of which has the same configuration as the cell group; and an output unit that outputs the input constraint circuit, wherein the selector enables switching of an input to the subsequent combinational circuit to any one of an initial value input of a sequential circuit in the circuit and an output from the antecedent combinational circuit.

8. The LSI analysis method according to claim 7, further comprising:

detecting a clock control circuit from the combinational circuit in the circuit;

identifying, by tracing-back from the clock control circuit to the cell group of the circuit, a first cell there among that supplies a signal to the clock control circuit;

identifying, by tracing-back the input constraint circuit from an identified cell among the subsequent cell group to the antecedent cell group, a second cell there among that supplies a signal to the identified cell corresponding to the first cell; and deleting, from the input constraint circuit, a signal transmission path between the first cell and the second cell.

9. The LSI analysis method according to claim 7, further comprising calculating a maximum power consumption of the circuit using the input constraint circuit.

* * * * *